Oct. 30, 1962 P. F. SMITH 3,061,321

DOUBLE CONTACT FLUID SEAL

Filed July 15, 1957

INVENTOR.
PAUL F. SMITH
BY Fulwider Mattingly Huntley
Attorneys

United States Patent Office 3,061,321
Patented Oct. 30, 1962

3,061,321
DOUBLE CONTACT FLUID SEAL
Paul F. Smith, Pacific Palisades, Calif., assignor to Parker-Hannifin Corporation, Cleveland, Ohio, a corporation of Ohio
Filed July 15, 1957, Ser. No. 671,795
3 Claims. (Cl. 277—180)

This invention relates to sealing means and particularly to improved fluid seal for use between mating surfaces.

To provide a pressure seal between mating surfaces, it has previously been common practice to insert a layer of deformable packing material which is compressed when the surfaces are mated. However, seals formed in this manner are incapable of withstanding high pressure, and the packing material may be used only once. To overcome these difficulties, various improved sealing means have been developed. One such improved means includes a groove in one mating surface which is fitted with a resilient deformable packing member. The deformable member is then deformed to lie entirely within the groove when the sealing means is in use between mating surfaces.

When sealing means of the above-described type are used between mated surfaces, the resilient deformable packing member is forced completely into the groove. The resilient packing member therefore exerts a continual force against a mating surface and thereby forms an effective pressure seal. One desirable form of sealing means of this type is shown and described in U.S. Patent No. 2,717,793, issued September 13, 1955, to Joseph F. Nenzell.

In such seals the packing member is resiliently deformed into void spaces formed at the sides of a central projection. One of these voids is, of course, on the pressure side of the seal and as fluid under pressure attempts to pass the central area it forces the central projection into sealing engagement with the opposed surface in the manner of the well known O ring. If this pressure is surging or cycling from a high to a low value there is constant working or shifting of the sealing portion of the packing member in accordance with the pressure. Over an extended period of time this movement of the packing member causes abrasion and wear of the sealing contact surface and leakage may occur. Also loss of resilience due to material fatigue may take place.

As mentioned, seals of the type described above normally utilize a single central protrusion or projection similar to an O ring, which emanates or projects from a groove in the rigid retaining body. This projection may then be deformed into channels, which are provided in the member on both sides of the projection. The mold used to form the resilient deformable packing member must therefore extend into the groove in the rigid retaining body in two side locations adjacent the groove walls, to form the channels in the resilient deformable packing member. Because of the configuration of seals of this type, the mold must pass quite close to the walls of the groove in the rigid retaining body, and in the event of slight misalignment, the mold may actually be urged against the rigid retaining body. In the event of such misalignment causing the mold to contact the rigid retaining body, the mold will usually be permanently damaged resulting in a considerable loss.

In forming a seal of the above-described type wherein a single projection is formed in the resilient deformable member to project from a groove, the resilient deformable member may be formed by injecting material into the groove while the material is in a plastic transitional state. The material, in a plastic state, will normally be injected into a cavity between the mold and the rigid retaining body through sprue openings. If the sprue openings are placed to enter the cavity at a position contacting the projection-forming portion of the mold, flash is normally formed along the top of the projection which must be accurately trimmed from this sealing surface. As an alternative, the sprue opening may be formed to cause the plastic-state material to enter the cavity through sprue openings between the location of the projection in the resilient member, and the edge or wall of the rigid retaining body. However, in the event that this mode of injection is used, the sprue openings must be very small and the injection pressures must be quite high.

With the foregoing in mind, the present invention contemplates positioning a resilient deformable packing member having a pair of projections within a groove of a rigid retaining body each of which establishes sealing contact with an opposed mating surface. A single channel is formed in the packing member between the two projections. When the device seals with mating surfaces which are drawn together, the two projections are deformed to lie within the single channel.

Any void space remaining within the groove lies between the two projections and as this space becomes filled with fluid under pressure the force exerted tends to force both projections into tighter sealing engagement. Also such fluid under pressure becomes entrapped and prevents mechanical shifting of the deformed projecting portions under surge or fluctuations in the outside pressures. Wear and abrasion of the packing member from such shifting is therefore avoided.

It is to be noted, that in forming the seal of the present invention, the mold for forming the deformable member extends into the groove in a single central section which is well removed from the edges of the groove in the rigid retaining member. As a result, the danger of the mold contacting the rigid retaining member is substantially reduced. Further, in accordance with the present invention, the sprue openings into a cavity formed between a mold and the rigid retaining member or body may be positioned in a wide part of the mold which forms the single channel in the packing member. As a result, the flash formed at the sprue opening is located in a relatively unimportant surface and additionally the sprue openings may be made of a larger, more desirable size.

With the foregoing in mind, it is a major object of the present invention to provide an improved sealing means having a resilient deformable packing member mounted within a relatively rigid retaining body and establishing two areas of sealing contact.

It is also an object of the invention to provide a seal of the character described in which the cross-sectional shape of the packing member results in a single central void space and thereby provides optimum sealing qualities.

An additional object of the invention is to provide a seal in which opposed packing members are formed in a single rigid retaining body in such a manner as to result in an improved seal between mating surfaces.

These and other objects and advantages of the invention will become apparent from the following detailed description of preferred and modified embodiments of the invention and from an inspection of the accompanying drawings in which.

Figure 1:
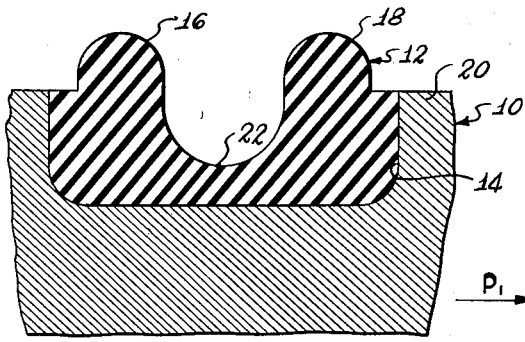
FIGURE 1 is an enlarged partial cross-sectional view taken through a preferred form of fluid seal constructed in accordance with the present invention.
Figure 3:
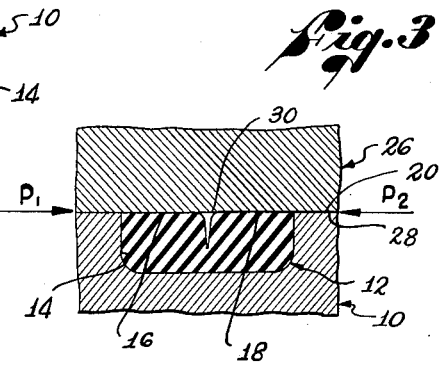
FIGURE 3 is an enlarged cross-sectional view of a portion of the typical joint shown in FIGURE 2.
Figure 2:
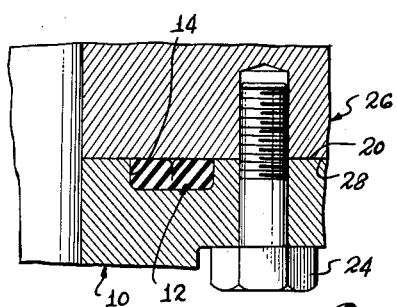
FIGURE 2 is a partial cross-sectional view taken through a typical joint embodying the seal of the present invention.

Referring now to the drawing, and particularly to FIGURES 1, 2 and 3 thereof, the numeral 10 designates generally a retaining body, formed of rigid material such as metal, to contain the resilient deformable packing member 12. The packing member 12 may be formed of various materials which are resiliently deformable. Synthetic rubber having a high compression resilience is one material which is satisfactory for use as the resilient deformable packing member 12.

The packing member 12 is molded in the retaining body 10 so that the surfaces of a continuous groove 14 in the retaining body 10 are in complete contact with the resilient packing member. By reason of the packing member 10 being in full contact with the surfaces of the groove 14, variations in the size of the groove 14 resulting from manufacturing inaccuracies will not affect the seal, as will be explained hereinafter.

The packing member 12 is formed in such a manner as to have projections 16 and 18 which extend above the surface 20 of the retaining body 10 and are preferably of rounded semicircular cross section. Between the projections 16 and 18 is a rounded concave channel 22, into which the projections 16 and 18 may be deformed. The total volume of the projections 16 and 18 which rise above the surface 20 is slightly less than the volume of the channel 22 which lies beneath the surface 20. It should also be noted that the material of the packing member 12 outside of the projections 16 and 18 completely fills the groove 14 flush with the surface 20 so that there is no void space at or near the side edges of the groove.

Referring specifically now to FIGURE 2, there is shown the retaining body 10 incorporating the packing member 12 drawn into contact by a bolt 24 with a faced part 26 having a surface 28. It is to be noted, that the surface 28 mates with the surface 20 of the retaining body 10.

Figure 4:
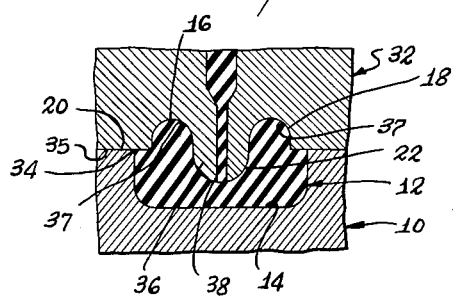
FIGURE 4 is a cross-sectional view through a mold and the retainer body showing the method and apparatus for forming the sealing means of the present invention.

FIGURE 3 shows an enlarged section of FIGURE 4, wherein the resilient deformable packing member 12 may be seen to be deformed in such a manner as to lie completely within the groove 14. Due to the volumetric relationship between the packing member 12 and the groove 14, a small void channel 30 exists in the packing member 12 when the part 26 is drawn against the retaining body 10. Void channel 30 represents, of course, the volume of channel 22 which is not filled by projections 16 and 18 and is located at the very center of groove 14. This void channel 30 is provided to assure that the volume of the packing member 12 does not exceed the volume of the groove 14. As previously indicted, if the volume of the packing member 12 exceeds the volume of the groove 14, extrusion of the material of the packing member outside of the groove and between the surfaces 20 and 28 will occur. Such condition will permit leakage, destroy the reusability of the packing member, and weaken the strength of the structure.

To prevent such extrusion it is not necessary that the volume of channel 22 actually exceed the volume of projections 16 and 18. However, under manufacturing conditions some tolerance is necessary, and the void pocket 30 is therefore highly desirable. When the projections 16 and 18 are deformed down into channel 22 it will be seen that all of the internal flow is away from the sides of the groove 14 where pinching of the material of the packing member could occur. After being deformed, it will also be seen that the projections 16 and 18 exert a strong upward pressure creating two areas of sealing contact to resist fluid flow across the groove.

Under high pressure conditions, the positioning of void channel 30 and the fact that it is the only void space within the groove 14 becomes very important. There are always two outside fluid pressures acting across the seal and these are represented in FIGURE 3 as P1 and P2. Assume that P1 is the greater of these two pressures, and that, as in the case in most pneumatic and hydraulic equipment, P1 is a fluid pressure which may surge or fluctuate between large limits.

When the seal is initially deformed to the shape shown in FIGURE 3 the channel 30 is a void space filled only with the air entrapped therein under a relatively low pressure. However, when the equipment is operating and a high value of the fluid pressure P1 is reached, this fluid forces its way towards the groove 14 and trys to pass by the deformed projection 16. Some leakage of this fluid over the projection may occur. As this happens, the channel 30 becomes filled with fluid under the high pressure value P1 and this pressure now acts in a direction to force both the deformed projections 16 and 18 into tighter sealing engagement with the opposing surface 28. Considering now the deformed projection 18 it will be seen that both the pressure P1 and the resilience of the packing material are acting to tighten the sealing engagement against surface 28. If the value of P1 increases, the sealing engagement of deformed projection 18 becomes even greater, and any fluid leakage across the groove is effectively resisted.

When the value of P1 decreases the fluid under pressure in channel 30 remains under the higher initial value since it cannot escape back over the deformed projection 16. This is an important factor in stabilizing the seal and preventing mechanical shifting of the packing member under surging or cyclical pressure conditions. It has been found by tests that in certain high pressure equipment, wherein O-ring seals in grooves are used, there is sealing failure due to actual abrasion and wear of the seal caused by changes in shape and position of the seal under changing pressure conditions. This problem is clearly overcome by the design of the subject device.

To form the described embodiment of the sealing means, molding apparatus as shown in simplified form in FIGURE 4 may be used. The molding apparatus includes a mold 32 having a forming face 34 shaped in such a manner as to form the sealing surface of the packing member 12. The forming face 34 is supported over the groove 14 by a supporting face 35, to thereby form a cavity into which the material forming the packing member may be forced. The molding operation takes place while the material to form the packing member is in a plastic transitional state and is injected by pressure into the cavity.

The mold face 34 is shaped to provide a central section and side sections which are complemental to the shape of the finished packing member as previously described. A central projection 36 extends downwardly beyond the plane of supporting face 35 and is of rounded generally semi-circular cross section. This projection 36 forms the central channel 22 in the packing member.

On each side of the central projection 36 are concave rounded channels 37 which are recessed above the plane of supporting face 35 and form the member projections 16 and 18. The volumetric relationship of channels 37 to projection 36 in relation to the supporting plane is such that the volume of the latter is slightly greater than the total volume of the two channels for the reasons previously mentioned. It should be noted that this relationship exists independent of variations in the depth, width, or other irregularities in the shape of groove 14 which may occur in manufacturing.

The overall width of the forming face 34 between the outer edges of the two channels 37 is somewhat less than the minimum width of groove 14 so that the outer portions of member 12 are formed flush with the surface of body 10 as previously described. As will be understood, in the molding operation the body 10 is held rigidly in place relative to mold 32 and the latter is seated tightly down on the surface 20. With proper registration, projection 36 is just centered in groove 14 as shown in FIGURE 4. In manufacturing, misregistration or a defective groove 14 may occur, and if the projection 36 were to be forced into engagement with the rigid surface 20, destruction or severe damage to the expensive mold 34 would occur. In this connection the design of the seal is of great importance since it will be seen that a relatively great amount of misregistration of the mold and groove 14 can occur before there is any possibility of striking the projection 36 on the surface 20.

In order to inject the plastic packing material into the cavity formed by groove 14 and forming face 34 sprue openings 38 are provided. These sprue openings are preferably extended downwardly through projection 36 and may be relatively large in accordance with the widths of the projection. This again provides a twofold advantage in manufacturing. First, the flash formed at the sprue openings is away from the working portions 16 and 18 of the member where actual sealing contact is made. Less accurate and inexpensive flash trimming operations may therefore be used. Also, the use of relatively large sprue openings permits lower injection pressures and less expensive molding equipment.

Figure 5:
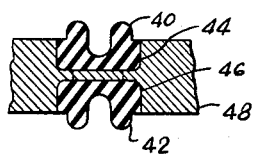
FIGURE 5 is a cross-sectional view taken through a modified sealing means constructed in accordance with the present invention.
Figure 6:
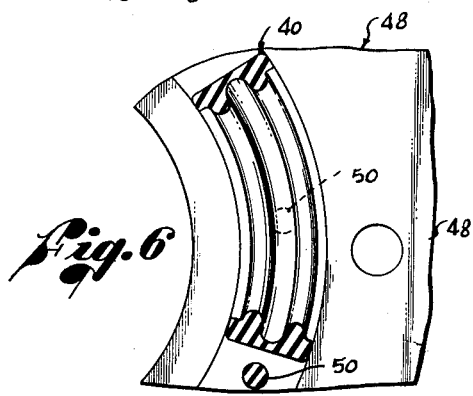
FIGURE 6 is a partial plan view of a seal means constructed in accordance with the present invention showing a portion of the packing member broken away.

A modified form of the seal which may be designated as a two-sided seal is shown in FIGURES 5 and 6. This form of the invention is particularly useful wherein two abutting members must be sealed such as in the case of a joint between flanged pipe sections. In this modified form of the seal the packing member is formed into a separate rigid body which is disposed between the two abutting members forming the joint.

As shown in FIGURE 5, two resilient deformable packing members 40 and 42 are placed in grooves 44 and 46 in a plate 48. The plate 48 constitutes the retaining body for both packing members and may be of any desired configuration. The shape of packing members 40 and 42 are the same in all respects as the shape of the packing member 12 as has previously been described. In addition, openings 50 are formed between the grooves 44 and 42 so that the two packing members 40 and 42 are interconnected back to back. This is accomplished through the molding operation by flowing the material of the packing members through the openings 50 to form integrally with each of the packing members short stub like connectors of the parent material. These connectors serve to hold the packing members 40 and 42 in place and prevent movement of either relative to the plate 48.

The embodiment of the invention shown in FIGURES 5 and 6 is formed by molding apparatus in which a pair of molds similar to the mold 32 are utilized on either side of the plate 48. Since the material injected into the cavity formed by the molds and the grooves may flow through the openings 50 from one side to the other of plate 48, it is only necessary that one set of sprue openings 38 be provided, and thus flash need be trimmed from only one side of the finished product.

While I have thus shown and described in some detail different forms of the seal and the apparatus and the methods for forming the same, it will be understood that changes of design and construction in both the seals and the manufacture thereof may be made by those skilled in the art. Therefore, I do not wish to be limited to the foregoing except as defined in the appended claims.

I claim:

1. In a sealed joint in combination with a flat faced opposed part: a retaining body including a flat part-engaging surface, said surface being provided with a continuous groove; and a resilient deformable packing member molded in said groove with its side portions flush with the outer edges of said groove and prior to assembly in said sealed joint rising therefrom to form a pair of symmetrical projections extending beyond the surface of said body for engagement with said opposed part, said member including a single central void channel therein between said projections and lying within said groove below said part-engaging surface, and having a total volume below the plane of the part-engaging surface prior to assembly greater than the volume of said projections above the plane of the part-engaging surface prior to assembly and forming a fluid trap space between the deformed projections when assembled in said sealed joint.

2. In a sealed joint in combination with a pair of opposed flat faced parts: a retaining body having opposed flat part-engaging surfaces, said surfaces being provided with continuous grooves; a resilient deformable packing member molded in each of said grooves in contact with substantially all the side and bottom surfaces within said groove, and prior to assembly in said sealed joint rising therefrom to form a pair of projections extending beyond the surface of said body for engagement with one of said opposed parts, said member including a single central void channel therein between said projections and lying within said groove, and having a total volume below the plane of the adjacent part-engaging surface prior to assembly greater than the volume of said projections above the plane of the same part-engaging surface prior to assembly and forming a fluid trap space between the deformed projections when assembled in said sealed joint.

3. In a sealed joint in combination with a flat faced opposed part: a retaining body including a flat part-engaging surface, said surface being provided with a continuous groove; and a resilient deformable packing member molded in said groove in contact with substantially all the side and bottom surfaces within said groove, and prior to assembly rising therefrom to form a plurality of projections extending beyond the surface of said body for engagement with said part, said member including a continuous void channel therein between said projections and lying within said groove, and having a total volume below the plane of the part-engaging surface prior to assembly greater than the volume of said projections above the plane of the part-engaging surface prior to assembly and forming a fluid trap space between the deformed projections when assembled in said sealed joint.

References Cited in the file of this patent

UNITED STATES PATENTS

| | | |
|---|---|---|
| 1,976,797 | Naylor | Oct. 16, 1934 |
| 2,055,103 | Hewitt | Sept. 22, 1936 |
| 2,505,540 | Goldhard | Apr. 25, 1950 |
| 2,513,178 | Jackson | June 27, 1950 |
| 2,629,132 | Wilcox et al. | Feb. 24, 1953 |
| 2,717,793 | Nenzell | Sept. 13, 1955 |
| 2,723,142 | Stebbins | Nov. 8, 1955 |
| 2,764,311 | Blackman | Sept. 25, 1956 |
| 2,842,388 | Holdeman | July 8, 1958 |